APPARATUS FOR SYNCHRONIZING STEREOPHONIC TRANSMISSION

Filed Jan. 20, 1960 2 Sheets-Sheet 1

3,255,315

APPARATUS FOR SYNCHRONIZING STEREOPHONIC TRANSMISSION

Hans Ferdinand Mayer, Munich-Solln, Hans-Martin Christiansen, Munich-Grosshadern, and Walter Arens, Munich-Solln, Germany, assignors to Siemens & Halske Aktiengesellschaft, Berlin and Munich, Germany, a corporation of Germany Filed Jan. 20, 1960, Ser. No. 3,646
Claims priority, application Germany, Jan. 21, 1959, S 61,421/59
5 Claims. (Cl. 179—15)

This invention is concerned with a method of and apparatus for synchronizing stereophonic transmission by means of pulse-amplitude modulation.

It is known in stereophonic transmission to effect successively brief periodic sampling of separately recorded signals and to transmit the interlaced sampling values. The operation thereby effected is in the nature of temporary multiplexing of the two channels by means of pulse-amplitude modulation. At the receiving end, the sampling values must again be distributed to the two channels; the distributing device must for this purpose operate in synchronism with the sampling device at the transmiting end.

The object of the invention is to provide a simple synchronizing method or system which is adapted for stereophonic transmission by means of pulse-amplitude modulation, especially in ultrashort wave broadcasting with frequency modulation.

According to the invention, the synchronizing method for stereophonic transmission of the initially indicated kind comprises superimposing at the transmitting end on each of the two signals, prior to the sampling, oppositely directed direct voltages of identical magnitude, multiplexing said superimposed signals forming a summation signal, transmitting said summation signal, and providing means at the receiving end for obtaining from the incoming summation voltage a synchronizing voltage with the scanning frequency, which synchronizes two impulse sequences displaced by 180° for the control of a channel distributor.

The impulse sequences controlling the channel distributor at the receiving end can be produced by means of an impulse generator which is correctively tuned by means of a controllable reactance. The regulation voltage for controlling the reactance is obtained by a phase comparison between the synchronizing voltage which is contained in the incoming summation voltage and phase-displaced by 90° and one of the two impulse sequences delivered by the impulse generator. However, the impulse sequences for controlling the channel distributor can also be derived directly from the synchronizing voltage in an impulse generator. The synchronizing voltage contained in the incoming summation voltage is for this purpose filtered out and conducted to the impulse generator over a controllable phasing member. The control voltage for the pasing member is obtained by phase comparison between the incoming summation voltage and a third impulse sequence delivered by the impulse generator, which is rotated in phase by 90° with respect to the impulse sequences serving for the control of the impulse distributor.

The various objects and features of the invention will appear in the course of the description of synchronizing devices which will be rendered below with reference to the accompanying drawings. In the drawings, FIG. 1 shows a transmitter in principle circuit representation;

Figure 1:
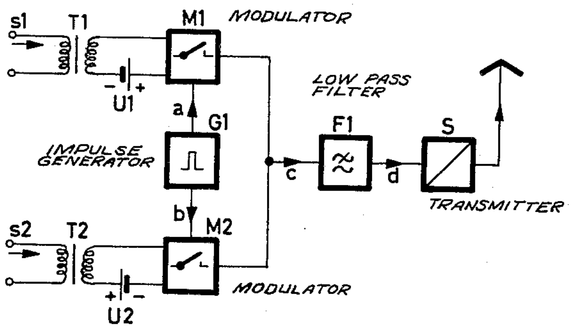
Figure 2:
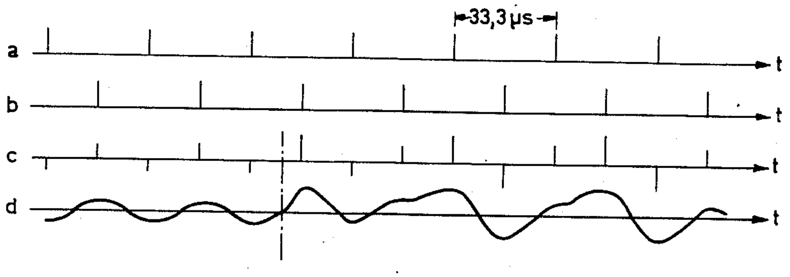
FIG. 2 illustrates voltage forms appearing in the transmitter.

As will be seen from FIG. 1, signals *s*1 and *s*2, recorded at the transmitting end by separate microphones, are respectively extended to transformers T1 and T2. At the secondary side of the respective transformers direct voltages U1 and U2, of identical magnitude but oppositely directed, are superimposed on each signal. It shall be assumed that each signal extends over a range from 30 cycles to 15 kilocycles. According to the sampling theorem, the scanning frequency must amount to at least twice that of the highest frequency to be transmitted. Accordingly, the impulse generator G1 delivers two 30 kilocycle impulse frequencies *a* and *b* which control the respective electronic switches in the modulators M1 and M2. The two impulse sequences *a* and *b* are represented in lines *a* and *b* of FIG. 2. The impulse spacing within each impulse sequence amounts to 33.3 $\mu$s., the two impulse sequences being mutually displaced by 16.7 $\mu$s.

As a result of the superimposition of the two direct voltages U1 and U2 upon the respective signals S1 and S2 the summation impulse sequence *c* at the parallel connected outputs of the two modulators M1 and M2 contains a 30 kilocycle component. The summation impulse sequence *c* is represented in line *c* of FIG. 2, namely, at the left of the dot-dash line when the two message signals *s*1 and *s*2 are absent, and at the right of the dot-dash line, when the message signals are present.

The frequency band of the impulse sequence *c* is by means of the low pass F1 limited to a value which is equal to twice the band width of each individual signal *s*1 and *s*2; the limit frequency of the low pass therefore amounting in the illustrated embodiment to 30 kilocycles. The voltage *d* appearing at the output of the low pass is shown in line *d* in FIG. 2, that is, again left of the dot-dash line when the two message signals *s*1 and *s*2 are absent and right of the dot-dash line when they are present. The summation voltage *d* which contains the two message signals *s*1 and *s*2 modulates in the illustrated example, in the high frequency part of the transmitter S, the frequency of a carrier oscillation. However, it is also possible to transmit the summation voltage *d* directly by means of other modulation methods.

It would suffice to superimpose a direct voltage on only one of the two message signals; however, this would have the disadvantage of non-symmetrical control of the transmitter.

Figure 3:
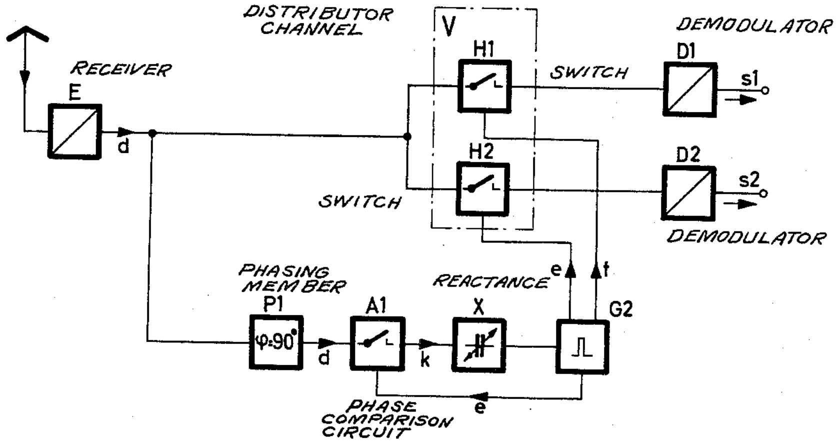
FIGS. 3 and 4 show in principle circuit representation receivers employing different synchronizing devices.

FIG. 3 shows in principle circuit representation a receiver for stereophonic transmission. The receiver part E contains the high frequency and intermediate frequency amplifiers both of which are constructed as in a receiver for monaural reception, and the discriminator for the frequency modulation, the low frequency part of which must however have a band width of at least 30 kilocycles. The voltage appearing at the output of the discriminator corresponds to the voltage course *d* at the transmitter.

Figure 5:
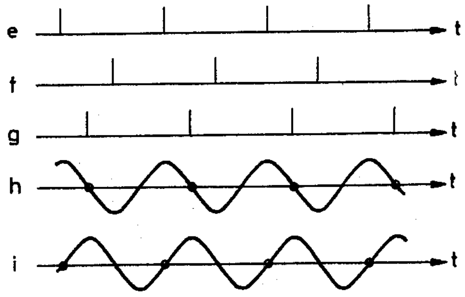
FIG. 5 indicates voltage forms appearing in the receivers.

The impulse generator G2 delivers, as the impulse generator at the transmitting end, two 30 kilocycle impulse sequences *e* and *f*, displaced by 180°, such impulse sequences controlling two electronic switches H1 and H2 in the channel distributor V; the impulse sequences *e* and *f* being represented in lines *e* and *f* of FIG. 5. The electronic switches H1 and H2 sample the summation voltage *d* and distribute the sampling values to the two channels. In order to effect the sampling at the proper instant, the two impulse sequences *e* and *f* must be synchronized with the impulse sequences *a* and *b* at the transmitter end. With proper synchronization, the two message signals *s*1 and *s*2 can be taken off at the outputs of the electronic switches H1 and H2, in the form of amplitude modulated impulses. The original message signals *s*1 and *s*2 are obtained again at the demodulators D1 and D2 which contain respectively a low pass.

The synchronizing device proper contains a phasing member P1 and a phase comparison circuit A1 for controlling a reactance X. The summation voltage *d* is conducted to the phasing member P1 which is so dimensioned that the 30 kilocycle synchronizing voltage *i* contained in the summation voltage is phase-displaced by 90°. One of the two impulse sequences delivered by the impulse generator G2, for example, the impulse sequence *e* is in the phase comparison circuit A1 checked with respect to coincidence in time with the 30 kilocycle synchronizing voltage *i*. The phase comparison circuit A1 consists basically of an electronic switch which is controlled by the impulse sequence *e* and which samples the phase-displaced summation voltage *d*. The obtained regulation voltage *k* depends only upon the position as to time of the switching impulse sequence *e* with respect to the zero passages of the synchronizing voltage *i*; the parts of the message signals *s*1 and *s*2 still contained in the summation voltage *d* do not yield any direct current component.

FIG. 5 shows the time conditions at synchronism; the sampling instants, indicated by small circles, coinciding with the zero passages of the synchronizing voltage *i*, that is, there will result a zero regulation voltage. If the impulse sequence *e* of the synchronizing voltage *i* advances or lags, there will result a negative or positive regulation voltage *k*. The regulation voltage effects a controllable reactance X, for example, a reactance tube, which effects corrective timing of the impulse generator G2.

Figure 4:
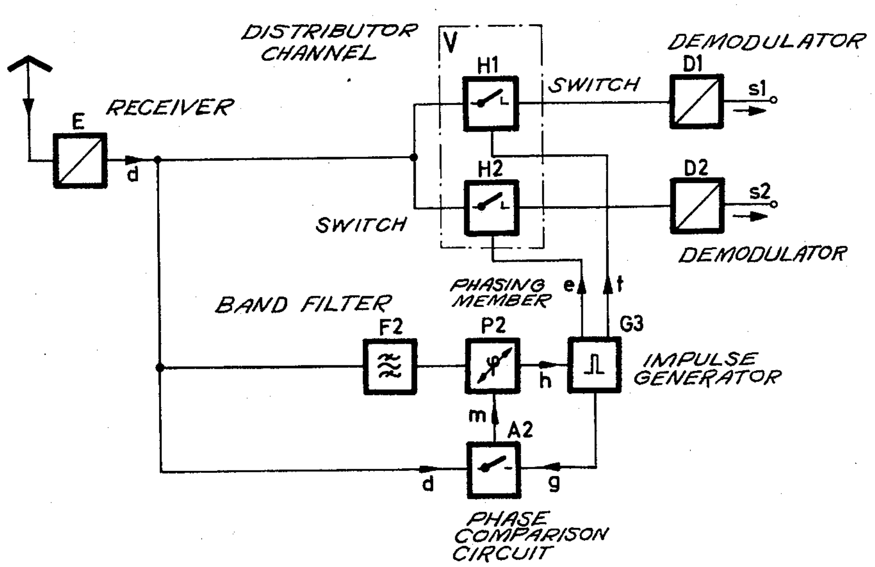

In the receiver according to FIG. 4, the impulse sequences *e* and *f* serving for the control of the channel distributor V are derived directly from the synchronizing voltage of an impulse generator G3. The synchronizing voltage is for this purpose filtered out from the summation voltage *d*, by means of a band filter F2 tuned to the sampling frequency, and conducted by way of a phasing member P2 to the impulse generator G3. The phasing member P2 is necessary so as to correct the phase displacement of the band filter F2. For a simple embodiment of the synchronizing device, it will suffice to correctly adjust the phasing member P2 but once. The position as to time of the impulse sequences *e* and *f* with respect to the synchronizing voltage *h* contained in the summation voltage *d* is shown in FIG. 5.

An automatic corrective phase setting or adjustment is advantageously carried out for equalizing or compensating the changes as to time of the alterations of the phase of the 30 kilocycle synchronizing voltage caused by inconstancy of structural elements, temperature fluctuations, etc. This is effected by the phase comparison circuit A2 which checks the coincidence as to time of a third impulse voltage *g* delivered by impulse generator G3, which impulse voltage is with respect to the two impulse sequences *e* and *f* phase-shifted by ±90°, with the synchronizing voltage *h* contained in the summation voltage *d*. The basic operation of the phase comparison circuit A2 is the same as that of the previously described phase comparison circuit A1 to FIG. 3. The conditions as to time at synchronism are apparent from FIG. 5; the sampling instants resulting from the impulse sequence *g* being indicated by small circles in connection with the synchronizing voltage *h*, contained in the summation voltage *d*. In the event of a shifting as to time of the impulse sequence *g* with respect to the synchronizing voltage *h*, there will result a positive or negative regulation voltage *m* which varies the controllable phasing member P2 until synchronism is effected.

A switch-over device is advantageously provided in the receiver, which is in the absence of synchronization voltage effective to bridge the two electronic switches H1 and H2 in the channel distributor V. This may happen, for example, when the synchronizing voltage is incident to the reception from a stereophonic transmitter for some reason absent. In such case, there will appear at the two outputs of the stereophonic receiver the sum of the two signals *s*1 and *s*2, that is, a monaural reception. This may moreover also happen upon receiving, with a stereophonic receiver, from a normal transmitter. The occurrence of receiver noises and exterior disturbances is lessened by the disconnection of the sampling device.

It is moreover possible to utilize the received synchronizing voltage as a criterion for computing charges in the event that the stereophonic reception should be subject thereto.

It may be mentioned in conclusion that transmissions from a stereophonic transmitter according to FIG. 1 may also be received with a normal broadcasting receiver. The receiver, the low frequency part of which has a band width of about 15 kilocycles, will accept the sum of the message signals *s*1+*s*2. The synchronizing devices will not disturb the monaural reception. It is merely necessary that the maximum frequency displacement of the stereophonic transmitter is equal to that of a normal transmitter, so as to avoid any distortions. Accordingly, the method of stereophonic transmission by means of pulse-amplitude modulation is also compatible, that is, transmitter and receiver with or without stereophonic provision can cooperate as desired.

Changes may be made within the scope and spirit of the appended claims which define what is believed to be new and desired to have protected by Letters Patent.

We claim:

1. A device for stereophonic transmission with the use of pulse amplitude modulation, comprising a transmitter having two signal current circuits at the input side thereof, means impressing on said circuits respective oppositely directed direct voltages of identical magnitude, and means for alternately sampling said current circuits to obtain at the outputs thereof from the direct voltages thereat a signal representing a synchronizing voltage with said output voltages being added together in the same direction, a receiver for receiving the transmission from said transmitter, said receiver having two channel switches and an impulse generator operative to deliver two pulse sequences which are phase shifted by 180° for controlling said channel switches, and means for synchronizing said impulse generator with said synchronizing voltage.

2. In the art of sterephonic transmission wherein two signals are by pulse-amplitude modulation multiplexed as to time, apparatus for synchronizing the transmitter with the receiver, comprising means for superimposing on each of the two signals prior to the sampling thereof oppositely directed direct voltages of identical magnitude, multiplexing said superimposed signals forming a summation signal, transmitting said summation signal, and means for obtaining at the receiver from the incoming voltage a synchronization with the sampling frequency which synchronizes the two impulse sequences, displaced by 180°, for the control of a channel distributor.

3. Apparatus according to claim 2, comprising an impulse generator for producing at the receiver the impulse sequences for controlling the channel distributor, means for displacing by 90° the synchronizing voltage contained in the summation voltage, means for sampling this voltage by the impulses of one impulse sequence of the impulse generator, and a reactance controlled by the sampled voltage for correctively tuning said impulse generator.

4. Apparatus according to claim 2, wherein the impulse sequences which control the channel distributor at the receiving end are derived in an impulse generator from the synchronizing voltage which is filtered out from the summation voltage by means of a filter tuned to the sampling frequency and conducted by way of a controllable phasing member to the impulse generator which delivers a third impulse sequence, said third impulse sequence being with respect to the two impulse sequences serving for the control of the channel distributor phase-displaced by 90°, the impulses of said third impulse sequence sampling the summation voltage, the sampled voltage controlling said phasing member.

5. Apparatus according to claim 4 comprising means at the receiving end for bridging the switching means of the channel distributor upon absence of the synchronizing voltage.

References Cited by the Examiner

UNITED STATES PATENTS

| | | | |
|---|---|---|---|
| 1,906,269 | 5/1933 | Hough | 179—15 |
| 1,957,537 | 5/1934 | Jenkins | 179—15 |
| 2,262,764 | 11/1941 | Hull | 179—15 |
| 2,352,634 | 7/1944 | Hull | 179—15 |
| 2,607,035 | 8/1952 | Levine | 179—15 |
| 2,645,770 | 7/1953 | Veaux | 179—15 |
| 2,718,554 | 9/1955 | Person | 179—15 |
| 2,744,961 | 5/1956 | Peek | 179—15 |
| 2,921,981 | 1/1960 | Kidd | 179—15 |
| 3,095,479 | 6/1963 | Le Blan | 179—15 |
| 3,099,715 | 7/1963 | Frank | 179—15 |

DAVID G. REDINBAUGH, *Primary Examiner.*

L. M. ANDRUS, R. H. ROSE, *Examiners.*

J. W. SAUNDERS, T. G. KEOUGH, R. L. GRIFFIN, *Assistant Examiners.*